United States Patent [19]

Olson et al.

[11] 4,129,632
[45] Dec. 12, 1978

[54] METHOD FOR EXTRUDING SLITTING AND FIBRILLATING THERMOPLASTIC FILM TAPES

[75] Inventors: Carl B. Olson, San Anselmo; Carl S. Weisner, Pleasant Hill; Phillip H. Parker, San Rafael, all of Calif.

[73] Assignee: Chevron Research Company, San Francisco, Calif.

[21] Appl. No.: 862,790

[22] Filed: Dec. 21, 1977

[51] Int. Cl.² .......................... B29D 7/02; B29C 17/14
[52] U.S. Cl. ..................................... 264/40.1; 264/146; 264/147; 264/342 RE; 264/DIG. 47
[58] Field of Search .................. 264/40.1, 146, 147, 264/DIG. 47, 210 R, 216, 342 RE

[56] References Cited

U.S. PATENT DOCUMENTS

| | | | |
|---|---|---|---|
| 3,308,215 | 3/1967 | Lost | 264/342 RE |
| 3,402,548 | 9/1968 | Wininger, Jr. et al. | 264/DIG. 47 |
| 3,550,826 | 12/1970 | Salmela | 28/1 |
| 3,639,573 | 2/1972 | Port | 264/DIG. 47 |
| 3,645,299 | 2/1972 | Eichler et al. | 264/147 |

OTHER PUBLICATIONS

"Can Computer-Controlled Extrusion Help?", L. L. Scheiner, *Plastics Technology*, Feb. 1974, pp. 43–49.

*Primary Examiner*—James B. Lowe
*Attorney, Agent, or Firm*—Dix A. Newell; T. G. DeJonghe; Lawrence S. Squires

[57] ABSTRACT

Film extrusion-fibrillation and film extrusion-narrow slitting processes for preparing fibrillated or narrow-width thermoplastic tape. The process is characterized by conducting the extrusion-orientation stage and the slitting or fibrillation stage as separate operations, thereby minimizing process disruptions caused by film defects and breakage, and further characterized by certain film shrinkage and heat treatment modifications which facilitate such separate stage operation. The fibrillated tapes can be twisted into cordage products. The narrow-width tapes are used to make carpet backing and indoor-outdoor carpet.

20 Claims, 1 Drawing Figure

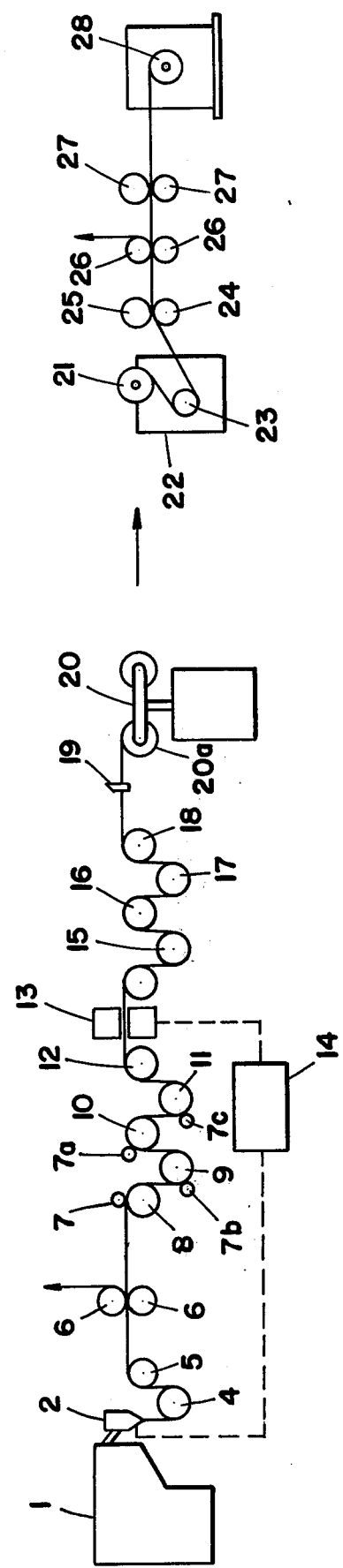

METHOD FOR EXTRUDING SLITTING AND FIBRILLATING THERMOPLASTIC FILM TAPES

FIELD OF THE INVENTION

1. Background of the Invention

This invention relates to extrusion-fibrillation and extrusion-slitting processes for preparing fibrillated or narrow-width thermoplastic ribbons or webs. In a further aspect, this invention relates to the aforementioned processes wherein the extrusion and film orientation stage are conducted as a separate operation from the fibrillation or slitting stage.

2. The Prior Art

As is well known, fibrillated thermoplastic ribbons or webs are used to manufacture products such as, for example, yarns, twines, indoor-outdoor carpet and carpet backings, as well as other textile products. Typically, the fibrillated ribbons are prepared by the prior art by extruding thermoplastic films at relatively high linear film speeds, e.g., 50–150 fpm, stretch-orienting the film, slitting the films into ribbons of a desired width, depending on the denier cordage desired, fibrillating the ribbons and then winding up the fibrillated ribbons. Examples of typical fibrillation processes can be had by reference to U.S. Pat. Nos. 3,496,259, 3,496,260 and 3,756,484. A general discussion of such processes can be found in MODERN TEXTILES, August 1969, pages 3–10.

Because of the economies inherent to integrated operation, especially for high-denier products, most modern large-width film extrusion fibrillation processes are conducted as a single in-line operation. It has now been discovered that by operating such processes as single in-line operations at wide film-line width starting with the initial extrusion of the film through the wind-up of the fibrillated ribbons generates problems which cause very substantial time losses and material wastages when making narrow denier tapes. Specifically, it was found that holes or defects, which are inherently present in the oriented film caused the individual ribbons to break during fibrillation, thus requiring shutdown of the entire operation. Because shutdown of the extruder is required a complete film break occurs making it necessary to rethread the film starting at the die orifice through the entire operation. This rethreading operation is, of course, time-consuming and product-consuming, and typically must be conducted manually. In addition, the extrusion must be restarted and continued until the process has lined out (i.e., until an acceptable uniform film is obtained), thus resulting in further operational time losses and material wastage. Since the material produced during this period and during the breakage and rethreading operation must be scrapped, i.e., in practice the material is remelted, repelletized and then recycled back to the film extruder.

These breakage problems, and correspondingly the time losses and product wastage, also occur in slitting operations, cutting narrow tapes (i.e., ⅛ inch or less in width) such as are used without fibrillation to make carpet backing.

The process of the present invention substantially reduces these time losses and material wastage by winding the oriented film into a film roll prior to slitting and then unwinding the film through the slitter and fibrillator as a separate stage in the over-all operation. In this way, the extrusion operation can be conducted virtually continously, regardless of the number of holes or defects in the extruded film. Tape breaks will necessarily still occur during the slitting and fibrillation operation, but rethreading of the slitting fibrillation operations is relatively simple and quick, as compared with the complete rethreading required for the over-all in-line operation. Further, film wastage caused by having to rethread the orientation rolls and line-out the extruder is eliminated.

Fibrillation has, of course, also been conducted as a separate operation by the prior art, although not for this reason, and is illustrated in U.S. Pat. Nos. 3,302,501 and 3,416,772.

It has now been further found that, probably because of the relatively high linear film speeds used in modern operations, that conducting the slitting and fibrillation as separate operations produced certain problems. Notably, even minor gauge lines or non-uniformities in film thickness were compounded when the film was wound on the transfer core, causing substantial unevenness. When the film was unwound at high speeds through the slitter and the fibrillator this unevenness caused jagged tears to be produced in the film resulting in film breaks. Further, the film was found to be distorted and wrinkled by winding after the orientation step and by shrinkage occurring while the film was stored on the film-transfer roll between operations.

In accordance with the process of the present invention, these problems have been obviated or reduced to an acceptable level, thus affording a more efficient and economically desirable process for producing fibrillated thermoplastic ribbons or tapes and narrow-width tapes.

SUMMARY OF THE INVENTION

In summary, one process of the invention comprises the steps of extruding a film; orienting the film; controlling the oriented film to less than about 3% variation in thickness over its width; winding the film to form film rolls; unwinding the film from the film rolls over a heated surface under sufficient tension to remove wrinkles; slitting the film into ribbons; and fibrillating said film ribbons.

In summary, another process of the invention comprises the steps of extruding a film; orienting the film; controlling the oriented film to less than about 3% variation in thickness over its width; winding the film to form film rolls; unwinding the film from the film rolls over a heated surface under sufficient tension to remove wrinkles; and slitting the film into ribbons having a width of about from 0.3 to 1 cm.

In summary, further embodiments of the invention comprise the afore-described processes wherein the oriented film is heat-relaxed prior to winding.

THE DRAWING

The drawing is a schematic elevation view of a preferred embodiment of the invention, wherein like reference numbers refer to like elements.

FURTHER DESCRIPTION OF THE INVENTION AND PREFERRED EMBODIMENTS

In the first step of the process, a suitable thermoplastic polymer is fed to an extruder wherein the polymer is melted and sheared and then forced through a die orifice. The die orifice is initially adjusted to provide a film thickness, after orientation, of about from 0.025 to 0.05 mm. Preferably the film is formed by the so-called "chill roll film casting process," wherein the thermoplastic polymer is extruded through a slot die directly onto a chilled roll, thereby forming a film. Alternatively, the film can also be formed by the bath film casting process wherein the polymer is extruded through a slot die into a cooling bath or by the blown or bubble film method wherein the polymer is extruded through an annular die and air, or other inert gas, is introduced under slight pressure into the center of the film tube to form film bubble. In the case where a slot die has been used, the resulting film has edge beads. These edge beads are cut off before the film is oriented and optionally can be collected and fed back to the extruder. In the case of a blown film or bubble method, the film is slit and folded flat prior to longitudinal orientation. The preferred extrusion temperatures will vary with the particular polymer used and are generally well known, and in any event can be determined by routine optimizations well within the scope of those skilled in the art.

The chill-roll casting process is greatly preferred in the present process because it yields a film of more uniform thickness.

The polymers which can be used in this process are orientable, normally solid, crystalline thermoplastic polymers and copolymers which can be extruded into films having a thickness of about from 0.025 to 0.05 mm after orientation. Suitable polymers include, for example, polypropylene, high-density polyethylene, ethylene-propylene copolymer, poly-4-methyl-1-pentene, polyesters (e.g., polyethylene terephthalate), polyamides and the like, and physically and chemically compatible mixtures or blends thereof. By the term "compatible mixtures" is meant mixtures, blends, or alloys of one or more polymers and/or copolymers which do not significantly adversely affect the film-forming properties of the major component of the mixture. Generally such mixtures improve the properties of the film or cordage product or ultimate product — e.g., carpet, carpet backing, felt, etc. Also, as used herein, the term "polymer" shall generically refer to homopolymers, copolymers, and to compatible mixtures thereof. The polymers can also contain additives such as, for example, anti-static, lubricants, photostabilizer antioxidants, heat stabilizers, pigments, dyes, fillers, and the like. The process is especially applicable to polypropylene, and best results are obtained using polypropylene or blends containing a major portion thereof.

In the next step of the process, the film is oriented by any suitable procedure. Conveniently, the film can be oriented via drawing or stretching it at elevated temperatures. For example, the film can be heated to the desired temperature by passing it through a heating zone or over heated rolls or drums. It can be drawn in a single step or in a plurality of steps. Higher total drawn ratios can be obtained by using a plurality of drawing steps. The particular draw temperatures and draw ratios will vary with the particular polymer and are well known to the art or can be readily determined by those skilled in the art. Typically, draw ratios of at least about 4:1 to about, but below, the draw ratio at which the film begins to fibrillate spontaneously are used. In the case of polypropylene, typically, draw ratios of about from 5:1 to 12:1 and preferably about from 6:1 to 10:1, and temperatures in the range of about 115° to 155° C., preferably 135° to 140° C., are used.

After the film has been oriented, the thickness of the film across its width is measured and the die orifice then adjusted to provide an oriented film of the desired average thickness (typically about 0.025 to 0.05 mm) and having no more than a 3% variation in thickness over its width, based on the average film thickness, and preferably 2% or less. Both the measurement and adjustment can be done either manually or automatically. In some instances it may be necessary to make a series of orifice adjustments to effect the necessary film thickness uniformity, but typically this can be achieved with one or two orifice adjustments. Uniform film thickness is particularly important, because non-uniformities will be compounded on the film roll, thus causing ridges and valleys in the wound film roll and distorted film which results in the film tearing in the film slitter and fibrillator.

Preferably thickness-sensing means are provided to measure the thickness of the film, along its width, after it has been oriented, and relay means provided to relay this information to an automatic controller, which, in turn, adjusts the extruder die orifice to correct non-uniformities in film thickness.

Optionally, the oriented film can be relaxed in the opposite direction from stretching, and concomitantly shrunk, prior to winding. This reduces shrinkage which inherently occurs in drawn films and reduces film distortions caused by the wound film shrinking on the film roll. It would be desirable to completely preshrink the film in this step so as to prevent all film shrinkage on the film roll (typically about 1 to 2%, depending on the particular polymer and the degree of drawing); however it has been found that pragmatically the film can best be preshrunk on the order of 50–60%, based on total film shrinkage. Conveniently, this step can be effected by the use of one or more heat-setting rolls or drums, which are operated at a relatively hot temperature as compared to the orientation temperatures, followed by one or more rolls or drums operated at colder temperatures. The heat-setting rolls are operated at lower peripheral speeds, typically 1 to 5% lower, than the speed of the oriented film leaving the orienting stage. The temperature of the hot roll or rolls is typically about equal to or up to about 20° C. higher, and preferably about from 15° to 20° C. higher, than the temperature of the orienting heating rolls, or the hot temperature used in the orienting section, but necessarily lower than the melt temperature of the particular polymer used. Typically the cold roll or rolls are operated at temperatures of about from 5° to 65° C., and conveniently are operated at the temperature of normal plant cooling water, e.g., typically about 15°–25° C. The relaxing operation causes the film to relax in the opposite direction from the stretching direction and to shrink instantaneously as it passes through the heat-setting section. Because shrinkage occurs in the heating section and is a function of both temperature and contact time and because of the constraints on temperature necessitated by the melting point of the polymer, it is preferable to increase shrinkage by increasing contact time rather than temperature. Thus, typically more than one heating roll is used, whereas only one cooling roll is usually needed. Optimum temperatures and roll speeds will vary with a particular thermoplastic polymer used, but can be readily determined by those skilled in the art. For example, in the case of polypropylene, the heat-setting roll (or rolls) is typically operated at a surface temperature of from about 120° to 160° C., preferably from about 150° to 160° C., and the cold-setting roll is operated at a surface temperature of from about 15° to 65° C., preferably from about 20° to 30° C.

Also, optionally, the film can be slit into a plurality (typically 2 to 5) relatively wide widths prior to winding, by conventional slitting means, to facilitate the use of smaller width slitting and fibrillation equipment. Thus, by conducting the extrusion orientation operation separately and so dividing the film prior to winding, the size of the extruded film width is not limited by the size of the fibrillator. This is significant because a number of commercial extruders are capable of producing film widths on the order to 80 to 90 inches (203 to 229 cm), whereas commercial fibrillation and tape-slitting equipment is more efficient at lesser film widths. The use of smaller-width fibrillators and tape slitters also increases flexibility, since if film breakage does occur only that particular unit will need to be shut down and rethreaded.

The film is then wound, either with or without preshrinking, into rolls. This can be conveniently effected using a conventional wind-up, revolving-turret apparatus which facilitate continuous operation. Further information concerning suitable winding apparatus can be had, for example, by reference to "Modern Plastics Encyclopedia," p. 506 (1974–75), McGraw-Hill. The film rolls are then removed from the wind-up apparatus, either manually or by automatic conveyor means, and mounted on an un-wind apparatus.

The film is then unwound over a hot surface (e.g., hot shoe or rotating drum) under tension, which removes wrinkles from the film. The film is typically unwound over the hot surface under a tension of about from 2–10 pounds per inch of film width, and preferably about 4–6 pounds. This can be conveniently effected by using an un-wind stand or apparatus having a tension-controlled un-wind spindle. Preferably the un-wind stand is also equipped with a mechanism to lift the film off the heated surface when the operation is stopped to prevent melting of the film ends. We have also found that best results are obtained by providing the hot surface by the use of one or more heated drums or rolls rotating at about the same peripheral speed as the slitter or fibrillator is operated at. Removal of film wrinkles is critical to the successful operation of the fibrillation step, since such wrinkles will cause jagged tears to be formed in the film during fibrillation or slitting, thus requiring frequent shutdowns.

The optimum temperature for the hot surface will again vary with the particular polymer but typically be above 70° C. and below the melting point of the particular polymer and again can be readily determined by those skilled in the art. Typically, in the case of polypropylene, surface temperatures in the range of from about 85° to 130° C., and preferably from about 100° to 110° C., are used.

The film is then slit into a plurality of tapes or ribbons. This can be conveniently effected by the use of the knife blades laterally spaced apart at distances corresponding to the desired ribbon widths. Where the tapes are to be fibrillated, the film will be divided into tapes having a width of about from 0.3 to 3 cm and then fibrillated. Where the tapes are to be used directly for carpet backing, etc., the film will be divided into tapes having a width of about from 0.1 to 1 cm, and then wound into rolls or bobbins for storage. Further information relative to suitable slitting equipment can be had, for example, by reference to "Modern Plastics Encyclopedia," p. 508 (1974–75), McGraw-Hill.

In the next step of the process, the film is fibrillated, typically at a speed of about 400–1000 ft/min (120–300 meters/min). Best results are typically obtained using mechanical fibrillation means, such as, for example, described in U.S. Pat. Nos. 3,302,501, 3,496,260 and 3,550,826; however, other fibrillation methods could also be used, such as, for example, fluid and sonic fibrillation, e.g., see U.S. Pat. Nos. 3,423,888 and 3,345,242. For example, particularly good results are obtained using the mechanical fibrillation apparatus and procedure described in U.S. Pat. No. 3,756,484. In this process, a tooth roller and a pressure roller are positioned with their respective circumferential surfaces parallel and closely adjacent to and spaced apart from each other. The rolls are operated substantially synchronously and in opposite rotational directions with respect to each other at peripheral speeds of from about 1.5 to 20 times greater than the film speed. Helical grooves formed in the circumferential surfaces of the pressure roll mate with helical rolls of teeth extending radially from the circumferential surface of the tooth roller. The film is fed to and withdrawn from the roller such that the portion of the film being fibrillated contacts the pressure roll before it engages the teeth of the tooth roller and remains against the pressure roll until the teeth disengage that particular portion of the film.

The fibrillated ribbons or tapes emerging from the fibrillator, typically maintained under tension by the use of nip rolls, can be individually wound on a plurality of bobbins, or preferably are wound in rolls of about 16 to 24 tapes per bobbin or wind-up means.

In a further embodiment of the invention, the fibrillated tapes or ribbons can be fed directly into a twister, thus simultaneously twisting the fibrillated tape into cord or yarn and winding same. Also, a plurality of fibrillated tape from different fibrillators can be fed to a common twister, thus providing a composite yarn of heavier denier or by using different-colored tapes, a mosaic or multi-colored yarn can be produced. This latter embodiment is particularly significant in view of the difficulties and specialized equipment costs encountered in producing a mosaic yarn in a single-line operation (i.e., by extruding a multi-colored striped film such as, for example, described in U.S. Pat. No. 3,929,957). Hence, instead of extruding a striped film, a supply of film rolls of different colors can be stored, and then by simultaneously using two or more fibrillators respectively using different-colored films, small runs of multi-colored yarns can be made on short notice without having to start up the extrusion-orientation operation and without having to clean out multiple extruders after a small run. It should also be noted that because of the relative cost and mass of the extruder and orientating unit as compared with the slitter-fibrillator, it is quite commercially feasible to have a larger number of slitters and fibrillators than extruder-orientation units.

A further understanding of the invention can be had by referring to the drawing, wherein a preferred, non-limiting embodiment of the invention will now be described.

EMBODIMENT

In the drawing, reference number 1 refers to a screw extruder wherein a thermoplastic polymer, for purposes of illustration polypropylene, is melted, sheared, pressurized, filtered, and then transferred under pressure to slot extrusion die head 2. The thermoplastic is then extruded through the slot orifice 3 to form a semi-molten film and then cast upon a casting cooling roller 4 to form a thermoplastic film having an average thickness of about from 0.1 to 0.3 mm (e.g., 0.2 mm) and a width of about 198 cm at a rate of about 30 meters per minute. The extruder is typically operated at a temperature profile (extruder inlet-die orifice) of about from 205° to 245° C. The film is extruded through slot die orifice 3 at a temperature of about 240°–245° C. Casting roll 4 is operated at a temperature about from 20° to 30° C. and rotated at a peripheral speed of about 30 meters/min.

The film is then fed over guide roller 5 and then between a pair of trim rollers 6 which have end-cutting portions to remove the edge beads formed on the film during extrusion. The bead end cuttings are collected and can be repellitized and reused.

The film emerging from the trim rollers 6 passes over orienting rolls 8, 9, 10, 11, and is held against the respective rolls by conventional nip rollers 7, 7a, 7b, and 7c, respectively.

The film is initially stretched and oriented in the gap between a first orienting heating roller 8 and a first orienting cooling roller 9 and then further stretched and oriented in the gap between a second orienting heating roller 10 and a second orienting cooling roller 11. Stretching is effected by operating the orienting cooling rolls 9 and 11 at a higher peripheral speed, respectively, than the orienting heating rolls 8 and 10. Cooling roll 9 is operated at a peripheral or film speed rate of about 100 meters/min, or about 3.25 times the peripheral speed of heating roll 8 (30 meters/min). Cooling roll 11 is operated at a peripheral heat or film speed of about 275 meters/min, or 2.75 times the peripheral film speed of heating roll 10 (100 meters/min). Thus, in effect, the film is given a double stretching and orientation. This facilitates higher stretching and orientation than can be obtained in a single drawing-stretching operation, without causing fibrillation of the film. Heating rolls 8 and 10 are operated at a temperature of about from 150° to 160° C., and cooling rolls 9 and 11 are operated at a temperature of about 20°–25° C.

The oriented film is then between passed over guide roll 12 and then between film thickness sensing device 13, which continuously measures the thickness of the film along representative points of the film width. This information is relayed to automatic controller 14, which collates the information and selectively adjusts the slot orifice to correct nonuniformities in film thickness. A convenient and suitable sensing control system which can be used comprises a beta-ray gauge thickness sensor 13, which in turn conveys a signal representing variations in film thickness to a computer 14, which converts the beta-ray signal to effect continuous adjustment of the die orifice gap. Conveniently, the die orifice gap adjustments can be automatically made by using a die head, equipped with thermal expansion adjusting bolts, to control the die orifice, and electrical die bolt heaters. The die gap adjustments can then be made by the computer by controlling the electrical current supplied to the individual die bolt heaters to expand the bolts. A cooling stream of fluid, e.g., air, controlled by the computer, is conveniently employed to contact the individual adjusting bolt as needed to effect contraction. This form of control system is presently commercially available, and is effective to control film gauge within 1% over a 96-inch film width.

The film is then passed over film shrinking-heating rolls 15, 16 and 17 and cold roll 18 to permit the film to relax in the opposite direction from stretching and shrink the film as it passes through the heating section. Rolls 15, 16 and 17 are operated at a peripheral film speed of about 1–5% (e.g., 4%) lower than the speed of the final drawing roll 11. Heating rollers 15, 16 and 17 are operated at temperatures of about from 150° to 160° C., and cooling roller 18 is operated at about from 20°–25° C.

The film passing from roller 18 is divided into 3 films of approximately equal width by two equidistantly spaced knives 19 (only one shown).

The film is then wound up into rolls 20a by turret winders 20 (only one shown), which permits continuous winding and unloading of wound rolls without stopping the extrusion-orientation operations.

Film roll 21 is placed on un-wind stand 22 and unwound over a heated roller 23 under 4 to 6 lbs tension per inch of width, to flatten and remove wrinkles from the film which would otherwise cause tearing and breakdown during the fibrillation operation. Roller 23 is operated at a surface temperature of about from 85° to 110° C. (e.g., 100°–105° C.), and a peripheral speed of about 250 meters/min.

The film is then fed to shear-knife rollers 24–25 at about 250 meters/min and divided into a plurality of ribbons or tapes having a width of about 7 mm. Excess trim or film cuttings are removed by rollers 26 and collected for recycle.

The tapes or ribbons are then fed at about 250 meters/min directly to the fibrillator rolls 27 (described in U.S. Pat. No. 3,756,484) which are rotating at a peripheral speed of about 500 meters/min wherein the ribbons or tapes are fibrillated.

The fibrillated tapes are then wound under slight tension on tape winders 28.

Obviously, many modifications and variations of the invention described hereinabove, and in the claims, can be made without departing from the essence and scope thereof.

What is claimed is:

1. A process for preparing thermoplastic fibrillated tapes which comprises sequentially extruding a film-forming thermoplastic material to form a thermoplastic film; orienting said film and controlling said extrusion to provide an oriented film having less than about 3% variation in thickness over its width; winding said oriented film to form a film roll; unwinding the film from said film roll over a hot surface under tension to remove wrinkles from said film; slitting said film into tapes and fibrillating said tapes.

2. The process of claim 1 wherein said thermoplastic material is selected from the group consisting of polypropylene, high density polyethylene, ethylene-propylene copolymer, poly-4-methyl-1-pentene, polyesters, polyamides and compatible mixtures thereof.

3. The process of claim 1 wherein at least a major portion of said thermoplastic material is polypropylene.

4. The process of claim 1 wherein said extrusion is controlled to provide an oriented film having less than about 2% variation in thickness across its width.

5. The process of claim 1 wherein the oriented film is heat-relaxed prior to said winding to reduce film shrinkage in said film roll.

6. The process of claim 1 wherein said tapes are mechanically fibrillated.

7. A process for preparing narrow-width thermoplastic tapes which comprises the sequential steps of extruding a film-forming thermoplastic material to form a thermoplastic film; orienting said film and controlling said extrusion to provide an oriented film having less than about 3% variation in thickness over its width; winding said oriented film to form film rolls; unwinding the film from said film roll over a hot surface under tension to remove wrinkles from said film; and slitting said film into tapes having a width of about from 0.3 to 1 cm.

8. The process as in claim 7 wherein the oriented film is heat-relaxed prior to said winding to reduce film shrinkage in said film roll.

9. The process as in claim 7 wherein at least a major portion of said thermoplastic is polypropylene.

10. A process for preparing thermoplastic fibrillated tapes which comprises the sequential steps of:
(a) extruding a film-forming thermoplastic through a narrow elongated slot orifice to form a molten film and casting the molten film upon a rotating casting cooling drum to form a film;
(b) trimming the width ends of said film to remove edge beads;
(c) passing said film to an orientation section comprising at least one orientation roll sequence comprising at least one orienting heating roll followed by at least one orienting cooling roll and whereby said film passes over and against said orienting rolls and wherein said orienting heating and cooling rolls are rotated at such relative speeds that the film leaves said orientation section at a speed at least about four times greater than the speed at which it enters the orientation section but below the relative speed stretch ratio at which the film fibrillates, thereby orienting said film;
(d) measuring the thickness of the oriented film across its width and adjusting said slot orifice to provide an oriented film having less than about 3% variation in thickness across its width;
(e) winding said oriented film to form film rolls;
(f) unwinding the film from said film roll over a hot surface, under a tension of about from 2 to 10 pounds per inch of film width, to remove wrinkles from said film;
(g) slitting said film into a plurality of tapes having a width of about from 0.3 to 1 cm; and
(h) fibrillating said tapes.

11. The process of claim 10 wherein said tapes are mechanically fibrillated.

12. The process of claim 10 wherein said thermoplastic is selected from the group consisting of polypropylene, high density polyethylene, ethylene-propylene copolymer, poly-4-methyl-1-pentene, polyesters, polyamides and compatible mixtures thereof.

13. The process of claim 10 wherein at least a major portion of said thermoplastic is polypropylene.

14. The process of claim 10 wherein said extruder is controlled to provide an oriented film having less than about 2% variation in thickness across its width.

15. The process of claim 10 wherein measured oriented film is heat-relaxed prior to winding to reduce film shrinkage in the film roll by at least 50%.

16. The process of claim 17 wherein said film is heat-relaxed by passing said measured oriented film over at least one heated roller, at a temperature of about from 150° to 160° C., rotating at a peripheral speed of about 1–5% less than the speed at which said film leaves said orientor.

17. The process of claim 13 wherein the orientation section comprises a plurality of orienting heating and cooling roll sequences and wherein the relative peripheral speeds of the orienting heating and cooling rolls are controlled such that the film leaves the orientation section at a speed of about from 6 to 10 times the speed at which the film enters the orientation section.

18. A process for preparing narrow thermoplastic tapes which comprises the sequential steps of:
(a) extruding a film-forming thermoplastic through a narrow elongated slot orifice to form a molten film and casting the molten film upon a rotating casting cooling drum to form a film;
(b) trimming the width ends of said film to remove edge beads;
(c) passing said film to an orientation section comprising at least one orientation roll sequence comprising at least one orienting heating roll followed by at least one orienting cooling roll and whereby said film passes over and against said orienting rolls and wherein said heating and cooling rolls are rotated at such relative speeds that the film leaves said orientation section at a speed at least about four times greater than the speed at which it enters the orientor but below the relative speed stretch ratio at which the film fibrillates, thereby orienting said film;
(d) measuring the thickness of the oriented film across its width and adjusting said slot orifice to provide an oriented film having less than about 3% variation in thickness across its width;
(e) winding said oriented film to form film rolls;
(f) unwinding the film from said film roll over a hot surface having a temperature above 70° C. but below the melting point of the thermoplastic, under a tension of about from 2 to 10 pounds per inch of film width, to remove wrinkles from said film; and
(g) slitting said film into a plurality of narrow tapes having a width of about from 0.3 to 1 cm.

19. The process of claim 18 wherein measured oriented film is heat-relaxed prior to said winding to reduce film shrinkage in said film roll by at least 50%.

20. The process of claim 18 wherein said thermoplastic is selected from the group consisting of polypropylene, high density polyethylene, ethylene-propylene copolymer, poly-4-methyl-1-pentene, polyesters, polyamides and compatible mixtures thereof.

* * * * *